(12) United States Patent
Miyahara

(10) Patent No.: US 6,999,568 B1
(45) Date of Patent: Feb. 14, 2006

(54) POSITION SPECIFYING SYSTEM, INFORMATION COLLECTING SYSTEM, INTERNET CONNECTING SYSTEM, AND METHOD OF THE SAME, AND STORAGE MEDIUM STORING THEREIN PROGRAM THEREOF

(75) Inventor: Fumiyuki Miyahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/564,422

(22) Filed: May 4, 2000

(30) Foreign Application Priority Data

May 7, 1999 (JP) .................................. 11-126985

(51) Int. Cl.
*H04M 1/56* (2006.01)
*G06F 15/16* (2006.01)

(52) U.S. Cl. ..................... 379/142.15; 379/142.07; 379/142.1; 709/219

(58) Field of Classification Search ............ 379/142.15, 379/142.07, 142.1, 142.16, 142.17, 88.13, 379/93.17, 93.23, 265.02, 201.04, 211.02, 379/212.01, 220.01, 221.01, 265.01, 309; 709/219, 225; 370/352

See application file for complete search history.

(56) References Cited

U.S. PATENT DOCUMENTS 6,571,290 B2 * 5/2003 Selgas et al. ............... 709/228
6,661,878 B1 * 12/2003 Mirashrafi et al. ......... 379/88.13
6,795,852 B1 * 9/2004 Kleinrock et al. .......... 709/220

FOREIGN PATENT DOCUMENTS

| JP | 03-283961 | * 12/1991 |
| JP | 9-319300 | 12/1997 |
| JP | 10-65937 | 3/1998 |
| JP | 11-98264 | 4/1999 |
| JP | 11-098264 | * 4/1999 |

* cited by examiner

*Primary Examiner*—Curtis Kuntz
*Assistant Examiner*—Barry W Taylor
(74) *Attorney, Agent, or Firm*—Sughrue Mion, PLLC

(57) ABSTRACT

An internet connecting system enables internet connection to be implemented simply. The user starts present system when the user connects a client computer to an internet. The client computer makes a telephone call to a server of a provider. The side of the server judges whether telephone number can be acquired on the occasion of the reception. When the telephone number can not be acquired, it causes the client computer to be informed that the telephone number is non-informed. The client computer side who receives this information performs re-dial to the server with the telephone number added "186" thereto at the head of the server's telephone number. When the telephone number can be acquired, it causes the nearest access point to the client computer to be selected from an access point table according to the telephone number, before informing the client computer about the access point. The client computer makes a telephone call to the access point.

31 Claims, 9 Drawing Sheets

FIG. 11

| AREA CODE | ACCESS POINT | | CROWDED CONDITION |
|---|---|---|---|
| | NAME | TELEPHONE NUMBER | |
| 0166 | ASAHIKAWA | 0166-49-2443 | 3 |
| ∫ | | | |
| 0177 | AOMORI | 0177-61-1530 | 4 |
| ∫ | | | |
| 0297 | TORIDE-RYUGASAKI | 0297-70-1388 | 3 |
| ∫ | | | |
| 03 | TOKYO | 03-5792-9000 | 1 |
| | | 5798-9000 | 1 |
| | | 6791-7000 | 1 |
| | | 5281-8094 | 2 |
| ∫ | | ∫ | |
| | | 3518-5100 | 3 |
| 042 | TAMA-FUCHU | 042-359-8365 | 1 |
| ∫ | | 329-8460 | 4 |
| 052 | NAGOYA | 052-419-1941 | 1 |
| ∫ | | 398-9906 | 3 |
| 054 | SHIZUOKA-FUJIEDA | 054-621-1116 | 2 |
| ∫ | | | |
| 06 | OSAKA | 06-920-6277 | 1 |
| ∫ | | 910-1263 | 2 |
| 075 | KYOTO | 075-803-2660 | 1 |
| ∫ | | | |
| 076 | KANAZAWA-MATHUTOU | 076-292-8817 | 2 |
| ∫ | | | |
| 0836 | YAMAGUCHI | 0836-34-2260 | 3 |
| ∫ | | | |
| 0886 | TOKUSHIMA | 0886-37-4180 | 4 |
| ∫ | | | |
| 0985 | MIYAZAKI | 0985-55-1611 | 2 |
| ∫ | | 59-9006 | 5 |
| 098 | NAHA-URAZOE | 098-852-2095 | 3 |

POSITION SPECIFYING SYSTEM, INFORMATION COLLECTING SYSTEM, INTERNET CONNECTING SYSTEM, AND METHOD OF THE SAME, AND STORAGE MEDIUM STORING THEREIN PROGRAM THEREOF

BACKGROUND OF THE INVENTION

The present invention relates to an internet connecting system in order to connect a computer to an internet while utilizing the telephone number information service provided previously.

Description of the Prior Art

An internet communication is implemented while connecting a personal computer to the internet. Generally, a user of the personal computer attempts to make telephone charges cheaper when the user connects the personal computer to the internet. The user is conscious of the place where the personal computer is set in order to make telephone charges cheaper. The user attempts to make a telephone call to an access point of a most nearest provider to the establishment place of the personal computer. The establishment place of the personal computer is a prescribed place such as user's home or user's workplace. On this occasion, it is suitable that the user makes a telephone call to a prescribed access point that is the most nearest to the establishment place of the personal computer.

However, when the user attempts to connect a portable personal computer to the internet at the place where the user has gone, or at the place where the user has made an official trip, the user undergoes hardships considerably for finding place of an access point of the most nearest provider to the place where the user exists. Furthermore, even though the user had known such the access point beforehand, it is possible that the telephone number of the access point is altered at a later time.

Moreover, in the first place, it is difficult that the user sets the access point to the personal computer regardless of the fact that the personal computer is a portable personal computer or the personal computer is an installation type personal computer such as a desktop personal computer and so forth. Thus, the establishment of the access point causes connection to the internet to be difficult. The establishment of the access point becomes one cause of the difficulty of connection to the internet undoubtedly.

One example of the prior art achieves this kind of the problem. The Japanese Patent Application Laid-Open No. HEI 9-319300 discloses above-mentioned technique as "Information Processing Device, Information Providing System and Information Acquisition Method".

The official report describes technique of provision of information. There are information with local property in conjunction with a drive, a journey, a business trip, sports, or leisure. For instance, such information with local property is a hotel, a lavatory, a store, or leisure institution, and event information. The technique of provision of information is intended to provide such information with local property precisely and quickly from among a great deal of information.

FIG. 1 is a block diagram showing a conventional information processing system. FIG. 2 is a flowchart showing an outline of processing of the conventional information processing system. FIG. 1 shows configuration example of a local information acquisition system 50 using a portable type information processing terminal equipment and a WWW server 50 to be an information providing system which provides information to the local information acquisition system 50. FIG. 2 shows the outline of the processing of the local information acquisition system 50.

The user attempts to obtain the local information. Firstly, it causes the local information acquisition system 50 to be rendered ready (STEP S41 of FIG. 2). An input-output part 53 outputs instructions to an information management part in order to acquire the local information 52 (STEP S42). Continuously, the information management part 52 starts a local information acquisition part 54, thus implementing processing in order to raise a WWW browser (not illustrated). A series of following processing is implemented.

Firstly, a position acquisition part 51 acquires information of the place where one is at present using a measurement part of GPS (Global Positioning System) (STEP S43). The GPS, as is generally known, consists of 24 artificial satellites that the American army launches, control stations on the ground, and mobile stations of the user. The GBS is a system which enables position on the plane of the mobile station itself to be known in such a way that it causes distance between the mobile station and the artificial satellites more than three to be measured.

Next, an access management part 56 retrieves the most appropriate (the nearest) access point with respect to the place where the user is now at present from an access point data base 57. If the appropriate means for the access point is for instance, a portable telephone or PHS (Portable Handy Phone System) or so forth, it causes the portable telephone, or the PHS or so forth to be connected to the access point (STEP S44).

Further, connection of the internet is implemented by dial-up IP connection (STEP S45). A URL (Uniform Resource Locator: a standard establishing means for accessing resource on the internet, and resource specifying method) of the local information acquisition part 54 specifies the WWW server 60. Connection to the WWW server 60 is established (STEP S46). Furthermore, the access point data base 57 stores therein position and telephone number of a plurality of access points.

Subsequently, the information such as the place where the user is at present is transmitted for the WWW server 60 (STEP S47). The WWW server 60 receives the retrieved local information (STEP S48), before indicating received local information (STEP S49). In FIG. 2, subsequent processing from STEP S50, explanation hereof is omitted, because that is not related to the present invention directly.

In the conventional technique described-above, the user can save his trouble for executing selection of access point, accordingly, when the user utilizes the PDA (Personal Digital Assistant: Portable Information Terminal Equipment), it is capable of using an internet tool such as an electronic mail in anywhere, anybody, at a lower price.

However, in the conventional technique described above, firstly, it is necessary to acquire information of the place where the user is at present in order to know an access point. Thus, there is the problem that means, and/or procedure therefor is required.

Secondly, there is the problem that it is necessary to provide portable information terminal equipment in which such means and/or procedure is realized in the condition of low price, reduced space, small dissipation power and so forth.

Thirdly, the GPS is utilized in order to acquire information of the place where the user is at present, however, the GPS is essentially configured for the sake of military affairs. For that reason, there is the problem that SA (Selective Availability) error is included therein. In the SA error, it causes measurement accuracy to be deteriorated intentionally for the sake of civilian user. As to this point, in the described official report, method of differential GPS (DGPS) which compensates using error information is adopted with the result that it is capable of obtaining the accurate coordinates. However, some burden can not be avoided.

SUMMARY OF THE INVENTION

In view of the foregoing, it is an object of the present invention, in order to overcome the above-mentioned problems, to provide a system and a method which enable information of the place where the user is at present to be acquired with the exception of a special means and/or a complicated procedure.

It is another object of the present invention to provide a system and a method which enable the client computer concerned to be connected to the optimum access point without the exception that the user is not conscious of position of the client computer.

According to a first aspect of the present invention, in order to achieve the above-mentioned object, there is provided a position specifying system for specifying a position of a computer which is a caller on the basis of a telephone number obtained in such a way of utilizing a telephone number information service in order to communicate the telephone number of the caller to other party automatically.

According to a second aspect of the present invention, there is provided an information collecting system which comprises an acquisition means for acquiring a telephone number of a computer to be a caller while utilizing a telephone number information service in order to communicate the telephone number of the caller to other party automatically, a storage means storing therein a plurality of telephone numbers and information related to respective the plurality of telephone numbers while associating the plurality of telephone numbers with the information, and a collecting means for collecting information related to the telephone number from the storage means while retrieving the storage means with the telephone number of the computer acquired by the acquisition means.

According to a third aspect of the present invention, there is provided an internet connecting system which includes a first computer, and a second computer, for connecting the first computer to the internet through an access point, wherein the first computer comprises an access means which makes a telephone call to the second computer while utilizing a telephone number information service for informing a telephone number of a caller to the other party automatically, and which makes a telephone call to an access point concerned on the basis of information of the access point informed from the second computer to connect to the internet, and wherein the second computer comprises a means for acquiring the telephone number of the first computer that is informed in the case where the first computer makes a telephone call while utilizing the telephone number information service, a storage means storing therein a plurality of telephone numbers and information of the nearest access point of respective areas to which the plurality of telephone numbers are allocated while associating the plurality of telephone numbers with the information of the access point, and an access point acquisition means for informing the stored information of the nearest access point associated with the telephone number to the first computer, while retrieving the storage means with the telephone number of the first computer acquired by the acquisition means.

According to a fourth aspect of the present invention, there is provided an internet connecting system which includes a first computer, and a second computer, for connecting the first computer to the internet through an access point, wherein the first computer comprises an access means which makes a telephone call to the second computer, and which makes a telephone call to an access point concerned on the basis of information of the access point informed from the second computer to connect to the internet, and wherein the second computer comprises a storage means for storing a plurality of access points and information concerning crowded condition of a telephone circuit for respective plurality of access points while associating the plurality of access points with the information of crowded condition of the telephone circuit, and an access point acquisition means selecting required information of the access point to inform to the first computer on the basis of information of the crowded condition of the telephone circuit stored in the storage means.

According to a fifth aspect of the present invention, there is provided an internet connecting system which includes a first computer, and a second computer, for connecting the first computer to the internet through an access point, wherein the first computer comprises an access means making a telephone call to the second computer while utilizing the telephone number information service before making a telephone call to the access point concerned on the basis of information of the access point informed from the second computer in order to connect the first computer to the internet when there exists an information from the second computer so as to make a telephone call while utilizing the telephone number information service for informing the telephone number of the caller to the other party automatically after making the telephone call to the second computer, and wherein the second computer comprises an access means informing the first computer so as to make a telephone call again while utilizing the telephone number information service when the first computer makes a telephone call without utilizing the telephone number information service, an acquisition means acquiring the telephone number of the first computer that is informed when the first computer makes a telephone call while utilizing the telephone number information service, a storage means storing therein a plurality of telephone numbers, and information of the nearest access point of each area to which the plurality of telephone numbers are allocated respectively while associating the plurality of the telephone numbers with the information of the nearest access point, and an access point acquisition means retrieving the storage means using the telephone number of the first computer acquired by the acquisition means before informing the first computer about information of the nearest access point that is stored while being associated with the telephone number concerned.

According to a sixth aspect of the present invention, in the third aspect or the fifth aspect, there is provided an internet connecting system, wherein the storage means stores therein a plurality of telephone numbers and information of the nearest access point of each area to which the plurality of telephone numbers are allocated while associating the plurality of telephone numbers with the information of the nearest access points, and stores therein a plurality of access points and information of crowded condition of telephone circuits directed to the respective plural access points while associating the plurality of access points with the information of the crowded condition, and wherein the access point acquisition means selects information of required access point in order to inform the first computer on the basis of the telephone number of the first computer acquired by the acquisition means, the information of the access means stored in the storage means, and information of the crowded condition of the telephone circuit.

According to a seventh aspect of the present invention, there is provided an internet connecting system which includes a first and a second computer, for connecting the first computer to an internet through an access point, wherein the first computer comprises a storage means storing therein a plurality of telephone numbers and the nearest access point of each area to which the respective plurality of telephone numbers are allocated while associating the plurality of telephone numbers with the information of the nearest access point, an access means making a telephone call to the second computer while utilizing telephone number information service informing the other party about telephone number of caller automatically, and retrieving the storage means with own telephone number informed from the second computer, subsequently, making a telephone call to the nearest access point which is associated with the telephone number concerned to be stored, thus connecting to the internet, and a telephone number information means which is provided for the second computer, for informing the first computer while acquiring telephone number of the first computer when the first computer makes a telephone call while utilizing the telephone number information service.

According to an eighth aspect of the present invention, there is provided an internet connecting system which includes a first and a second computer, for connecting the first computer to an internet through an access point, wherein the first computer comprises a storage means storing therein a plurality of telephone numbers and the nearest access point of each area to which the respective plurality of telephone numbers are allocated while associating the plurality of telephone numbers with the information of the nearest access point, and an access means, when there exists an information from the second computer so as to make a telephone call while utilizing the telephone number information service for informing the telephone number of the caller to the other party automatically after making the telephone call to the second computer, for making a telephone call to the second computer again while utilizing the telephone number information service, and for retrieving the storage means with own telephone number informed from the second computer, subsequently, making a telephone call to the nearest access point which is associated with the telephone number concerned to be stored, thus connecting to the internet, and wherein the second computer comprises an access means informing the first computer so as to make a telephone call again while utilizing the telephone number information service when the first computer makes a telephone call without utilizing the telephone number information service, and a telephone number informing means acquiring the telephone number of the first computer when the first computer makes a telephone call while utilizing the telephone number information service before informing the first computer.

According to a ninth aspect of the present invention, there is provided a position specifying method for specifying a position of a computer to be a caller on the basis of a telephone number obtained while utilizing a telephone number information service which communicates the telephone number of the caller to the other party automatically.

According to a tenth aspect of the present invention, there is provided an information collecting method which comprises the processes of a storing process for storing therein a plurality of telephone numbers and information related to respective the plurality of telephone numbers while associating the plurality of telephone numbers with the information, an acquisition process for acquiring a telephone number of a computer to be a caller while utilizing a telephone number information service in order to communicate the telephone number of the caller to other party automatically, and a collecting process for collecting information related to the telephone number from the storage means while retrieving the storage means with the telephone number of the computer acquired by the acquisition means.

According to an eleventh aspect of the present invention, there is provided an internet connecting method for connecting a first computer to an internet through an access point under support of a second computer which comprises the processes of a storing process for storing therein a plurality of telephone numbers and information of the nearest access point of respective areas to which the plurality of telephone numbers are allocated while associating the plurality of telephone numbers with the information of the access point according to the second computer, a process for making a telephone call to the second computer while utilizing a telephone number information service for informing a telephone number of a caller to the other party automatically according to the first computer, a process for acquiring the telephone number of the first computer that is informed in the case where the first computer makes a telephone call while utilizing the telephone number information service according to the second computer, a process for informing the first computer about the stored information of the nearest access point associated with the telephone number, while retrieving the storage means with the telephone number of the first computer acquired according to the second computer, and a process for making a telephone call to an access point concerned on the basis of information of the access point informed from the second computer to connect to the internet according to the first computer.

According to a twelfth aspect of the present invention, there is provided an internet connecting method for connecting a first computer to an internet through an access point under support of a second computer which comprises the processes of a process for storing in a storage means a plurality of access points and information concerning crowded condition of a telephone circuit for respective plurality of access points while associating the plurality of access points with the information of crowded condition of the telephone circuit according to the second computer, a process for making a telephone call to the second computer according to the first computer, a process for selecting required information of the access point to inform to the first computer on the basis of information of the crowded condition of the telephone circuit stored in the storage means according to the second computer, and a process for making a telephone call to an access point concerned on the basis of information of the access point informed from the second computer to connect to the internet according to the first computer.

According to a thirteenth aspect of the present invention, there is provided an internet connecting method for connecting a first computer to an internet through an access point under support of a second computer which comprises the processes of a process for storing in a storage means a plurality of telephone numbers, and information of the nearest access point of each area to which the plurality of telephone numbers are allocated respectively while associating the plurality of the telephone numbers with the information of said nearest access point according to a second computer, a process for making a telephone call to the second computer according to the first computer, a process for informing the first computer so as to make a telephone call again while utilizing the telephone number information service when the first computer makes a telephone call without utilizing the telephone number information service informing the other party about the telephone number of the caller automatically, a process for making a telephone call to the second computer while utilizing the telephone number information service when the information exists according to the first computer, a process for acquiring the telephone number of the first computer that is informed when the first computer makes a telephone call while utilizing the telephone number information service according to the second computer, a process for retrieving the storage means using the telephone number of the first computer acquired by the acquisition means before informing the first computer about information of the nearest access point that is stored while being associated with the telephone number concerned according to the second computer, and a process for making a telephone call to the access point concerned on the basis of information of the access point informed from the second computer in order to connect the first computer to the internet according to the first computer.

According to a fourteenth aspect of the present invention, in the eleventh or the thirteenth aspect, there is provided an internet connecting method, wherein the storage means stores therein a plurality of telephone numbers and information of the nearest access point of each area to which the plurality of telephone numbers are allocated while associating the plurality of telephone numbers with the information of the nearest access points, and stores therein a plurality of access points and information of crowded condition of telephone circuits directed to the respective plural access points while associating the plurality of access points with the information of the crowded condition, and wherein the second computer selects information of required access point in order to inform the first computer on the basis of the telephone number of the first computer acquired by the acquisition means, the information of the access means stored in the storage means, and information of the crowded condition of the telephone circuit.

According to a fifteenth aspect of the present invention, there is provided an internet connecting method for connecting a first computer to an internet through an access point under support of a second computer which comprises the processes of a process for storing in a storage means a plurality of telephone numbers and the nearest access point of each area to which said respective plurality of telephone numbers are allocated while associating the plurality of telephone numbers with the information of the nearest access point according to the first computer, a process for making a telephone call to the second computer while utilizing telephone number information service informing the other party about telephone number of caller automatically according to the first computer, a process for informing the first computer about the telephone number of the first computer while acquiring telephone number of the first computer when the first computer makes a telephone call while utilizing the telephone number information service according to the second computer, and a process for retrieving the storage means with own telephone number informed from the second computer, subsequently, making a telephone call to the nearest access point which is associated with the telephone number concerned to be stored, thus connecting to the internet according to the first computer.

According to a sixteenth aspect of the present invention, there is provided an internet connecting method for connecting a first computer to an internet through an access point under support of a second computer 30 which comprises the processes of a process for storing in a storage means a plurality of telephone numbers, and information of the nearest access point of each area to which the plurality of telephone numbers are allocated respectively while associating the plurality of the telephone numbers with the information of the nearest access point according to the first computer, a process for making a telephone call to the second computer according to the first computer, a process for informing the first computer so as to make a telephone call again while utilizing the telephone number information service when the first computer makes a telephone call without utilizing the telephone number information service informing the other party about the telephone number of the caller automatically, a process for making a telephone call to the second computer again while utilizing the telephone number information service, when there exists an information from the second computer so as to make a telephone call while utilizing the telephone number information service for informing the other party about the telephone number of the caller automatically after making the telephone call to the second computer according to the first computer, and a process for retrieving the storage means with own telephone number informed from the second computer, subsequently, making a telephone call to the nearest access point which is associated with the telephone number concerned to be stored, thus connecting to the internet according to the first computer.

According to a seventeenth aspect of the present invention, there is provided a storage medium storing therein a program for executing an internet connecting method for connecting a first computer to an internet through an access point under support of a second computer which comprises the processes of a storing process for storing therein a plurality of telephone numbers and information of the nearest access point of respective areas to which the plurality of telephone numbers are allocated while associating the plurality of telephone numbers with the information of the access point according to the second computer, a process for making a telephone call to the second computer while utilizing a telephone number information service for informing a telephone number of a caller to the other party automatically according to the first computer, a process for acquiring the telephone number of the first computer that is informed in the case where the first computer makes a telephone call while utilizing the telephone number information service according to the second computer, a process for informing the first computer about the stored information of the nearest access point associated with the telephone number, while retrieving the storage means with the telephone number of the first computer acquired according to the second computer, and a process for making a telephone call to an access point concerned on the basis of information of the access point informed from the second computer to connect to the internet according to the first computer.

According to an eighteenth aspect of the present invention, there is provided a storage medium storing therein a program for executing an internet connecting method for connecting a first computer to an internet through an access point under support of a second computer, which comprises the processes of a process for storing in a storage means a plurality of access points and information concerning crowded condition of a telephone circuit for respective plurality of access points while associating the plurality of access points with the information of crowded condition of the telephone circuit according to the second computer, a process for making a telephone call to the second computer according to the first computer, a process for selecting required information of the access point to inform to the first computer on the basis of information of the crowded condition of the telephone circuit stored in the storage means according to the second computer, and a process for making a telephone call to an access point concerned on the basis of information of the access point informed from the second computer to connect to the internet according to the first computer.

According to a nineteenth aspect of the present invention, there is provided a storage medium storing therein a program for a process for storing in a storage means a plurality of telephone numbers, and information of the nearest access point of each area to which the plurality of telephone numbers are allocated respectively while associating the plurality of the telephone numbers with the information of the nearest access point according to the second computer, a process for making a telephone call to the second computer according to the first computer, a process for informing the first computer so as to make a telephone call again while utilizing the telephone number information service when the first computer makes a telephone call without utilizing the telephone number information service informing the other party about the telephone number of the caller automatically, a process for making a telephone call to the second computer while utilizing the telephone number information service when the information exists according to the first computer, a process for acquiring the telephone number of the first computer that is informed when the first computer makes a telephone call while utilizing the telephone number information service according to the second computer, a process for retrieving the storage means using the telephone number of the first computer acquired by the acquisition means before informing the first computer about information of the nearest access point that is stored while being associated with the telephone number concerned according to the second computer, and a process for making a telephone call to the access point concerned on the basis of information of the access point informed from the second computer in order to connect the first computer to the internet according to the first computer.

According to a twentieth aspect of the present invention, there is provided storage medium storing therein a program for executing the internet connecting method, in the eleventh aspect or the thirteenth aspect, wherein the storage means stores therein a plurality of telephone numbers and information of the nearest access point of each area to which the plurality of telephone numbers are allocated while associating the plurality of telephone numbers with the information of the nearest access points, and stores therein a plurality of access points and information of crowded condition of telephone circuits directed to the respective plural access points while associating the plurality of access points with the information of the crowded condition, and wherein the second computer selects information of required access point in order to inform the first computer on the basis of the telephone number of the first computer acquired by the acquisition means, the information of the access means stored in the storage means, and information of the crowded condition of the telephone circuit.

According to a twenty-first aspect of the present invention, there is provided a storage medium storing therein a program for executing an internet connecting method for connecting a first computer to an internet through an access point under support of a second computer, which comprises the processes of a process for storing in a storage means a plurality of telephone numbers and the nearest access point of each area to which the respective plurality of telephone numbers are allocated while associating the plurality of telephone numbers with the information of the nearest access point according to the first computer, a process for making a telephone call to the second computer while utilizing telephone number information service informing the other party about telephone number of caller automatically according to the first computer, a process for informing the first computer about the telephone number of the first computer while acquiring telephone number of the first computer when the first computer makes a telephone call while utilizing the telephone number information service according to the second computer, and a process for retrieving the storage means with own telephone number informed from the second computer, subsequently, making a telephone call to the nearest access point which is associated with the telephone number concerned to be stored, thus connecting to the internet according to the first computer.

According to a twenty-second aspect of the present invention, there is provided a storage medium storing therein a program for executing an internet connecting method for connecting a first computer to an internet through an access point under support of a second computer, which comprises the processes of a process for storing in a storage means a plurality of telephone numbers, and information of the nearest access point of each area to which the plurality of telephone numbers are allocated respectively while associating the plurality of the telephone numbers with the information of the nearest access point according to the first computer, a process for making a telephone call to the second computer according to the first computer, a process for informing the first computer so as to make a telephone call again while utilizing the telephone number information service when the first computer makes a telephone call without utilizing the telephone number information service informing the other party about the telephone number of the caller automatically, a process for making a telephone call to the second computer again while utilizing the telephone number information service, when there exists an information from the second computer so as to make a telephone call while utilizing the telephone number information service for informing the other party about the telephone number of the caller automatically after making the telephone call to the second computer according to the first computer, and a process for retrieving the storage means with own telephone number informed from the second computer, subsequently, making a telephone call to the nearest access point which is associated with the telephone number concerned to be stored, thus connecting to the internet according to the first computer.

As stated above, in the present invention, it causes the telephone number of the client computer to be acquired automatically while utilizing the telephone number information service provided previously. It is capable of connecting the client computer automatically to the nearest access point of the client computer or the smallest access point of the crowded condition of the telephone circuit according to the acquired telephone number. Accordingly, the user who manipulates the client computer enables internet connection to be achieved simply. On this occasion, the user is suitable that he may not even know the telephone number of own the client computer.

Further, there is provided a correspondence table between telephone number of the client computer and the nearest access point to the area to which the telephone number is added or telephone number of the client computer and the smallest access point of the crowded condition. It causes the corresponding table to be referred to according to the telephone number acquired, thus the user is capable of being connected to the optimum access point.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 11 is a view indicating one example of an access point in the present invention.

DETAILED DESCRIPTION OF THE PREFERRED EMBODIMENTS

There will be explained a conception of the present invention before describing embodiment in detail of the present invention.

The communications carrier provides telephone number information service. The user who manages a client computer utilizes the telephone number information service. The user collects telephone number of the client computer and related information thereof without being conscious of the place where the client computer is established while utilizing the telephone number information service. The user utilizes this technique. When the user attempts to connect the client computer to the internet, the client computer automatically makes a telephone call to telephone number on the basis of instruction from a server. The present invention provides the system which enables the client computer to make a telephone call to the telephone number in accordance with the instruction from the server automatically.

Figure 7:
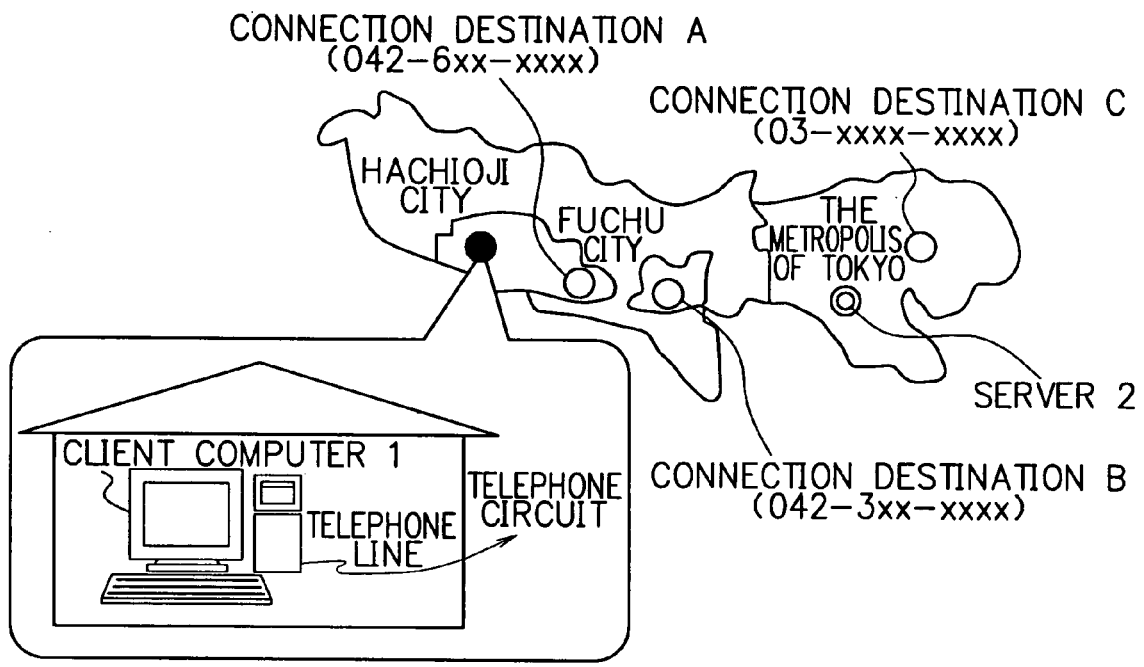
FIG. 7 is a view explaining a conception of the present invention.

FIG. 7 is a typical view showing directly conception of such the present invention. In FIG. 7, the client computer is established in Hachioji City of the Metropolis of Tokyo. A connection destination "A" is within Hachioji City. A connection destination "B" is within Fuchu City of the Metropolis of Tokyo. A connection destination "C" is within Ward of the Metropolis of Tokyo. There is a server within Ward of the Metropolis of Tokyo. It is capable of connecting the client computer 1 to computer network of the internet and so forth from any of the places for connection "A", "B", and "C".

When the user executes connection instruction for the internet, the client computer 1 makes a telephone call automatically for the server 2. The server 2 can be aware of a telephone number which the client computer 1 uses according to the telephone number information service.

The server 2 informs the related information to the client computer 1, for instance, the nearest connection destination "A" to the client computer 1. The client computer 1 makes a telephone call to the connection destination "A" on the basis of the information.

Thus, the present invention enables the client computer 1 to be telephone connection automatically to the connection destination "A" in such a way that the user who manages the client computer 1 is not conscious of the telephone number of the nearest connection destination "A" to the area where the client computer 1 is established.

Figure 8:
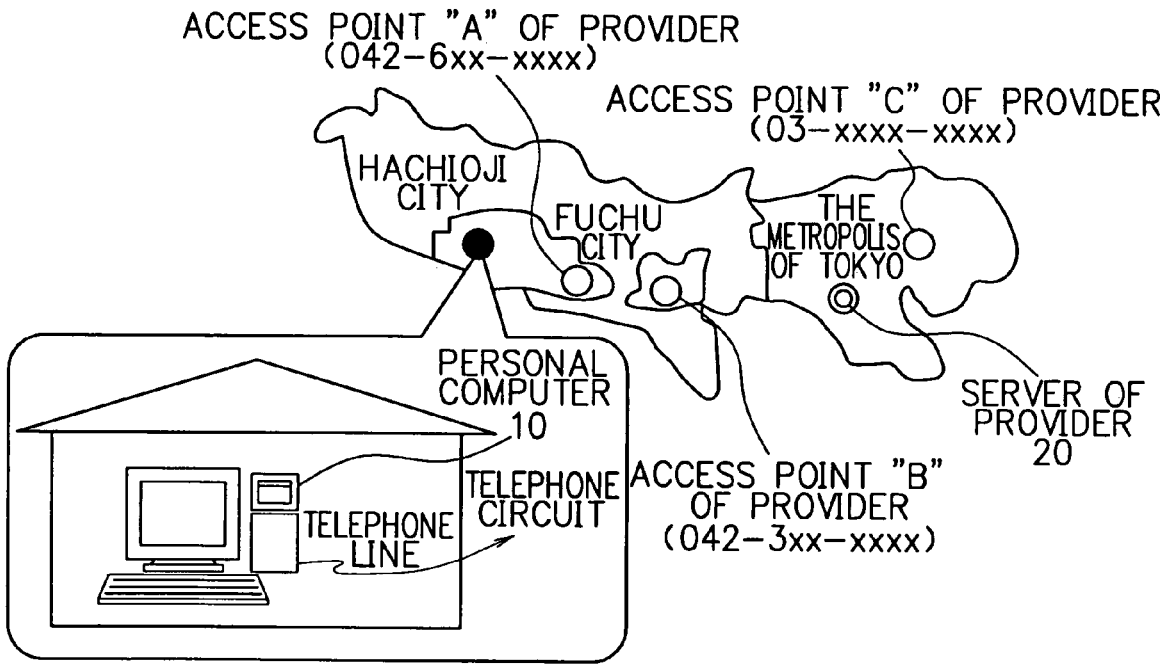
FIG. 8 is a view showing a concrete example of FIG. 7.

FIG. 8 shows an access point of a provider as a concrete example of the connection destination in FIG. 7. A personal computer 10 corresponds to the client computer 1 in FIG. 7. A server 20 of a provider corresponds to the server 2. Furthermore, access points "a", "b", and "c" of the provider correspond to respective connection destinations "A", "B", and "C".

Next, there will be described an embodiment of the present invention.

Figure 1:
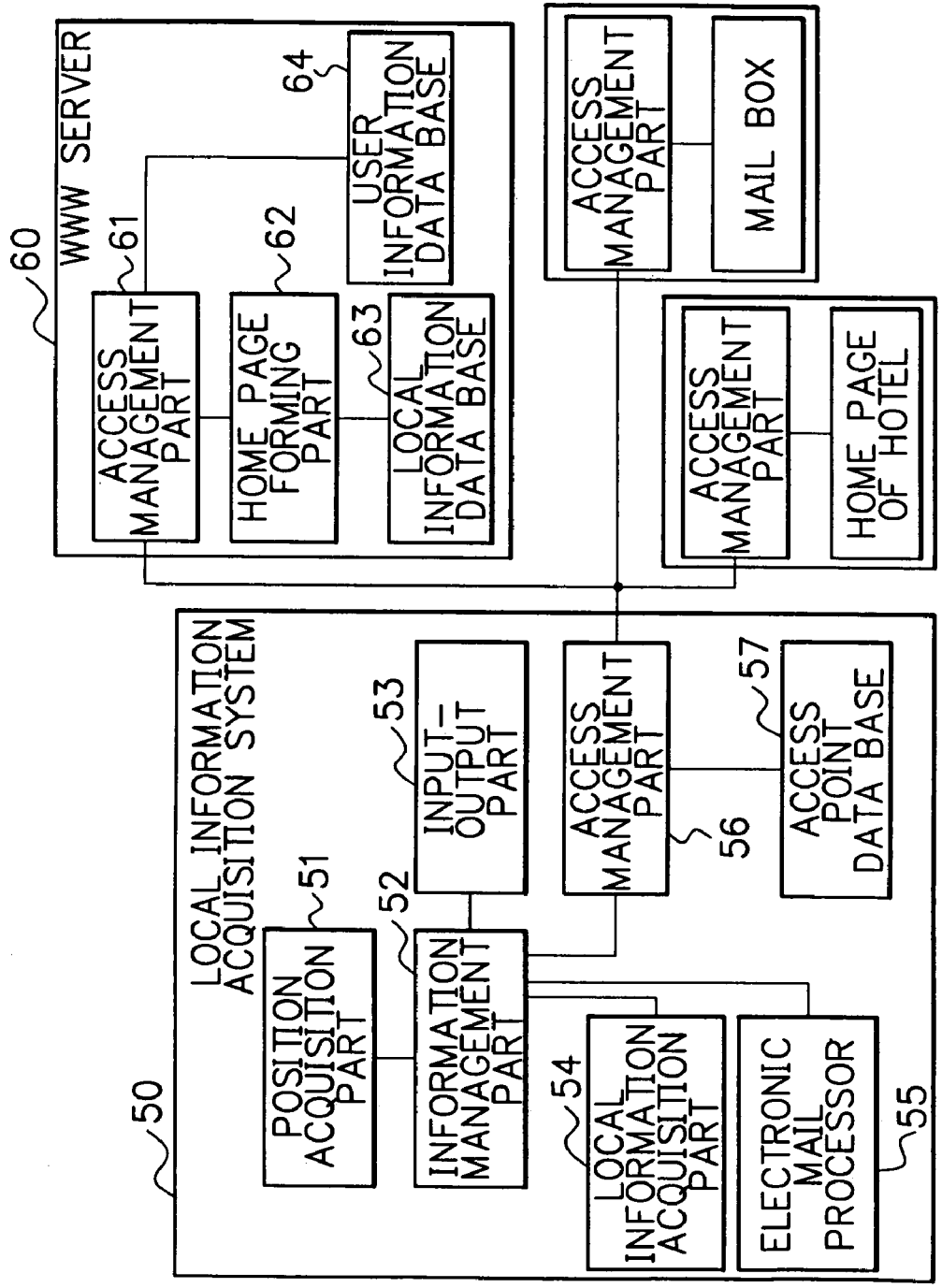
FIG. 1 is a block diagram showing one example of the conventional technique.
Figure 2:
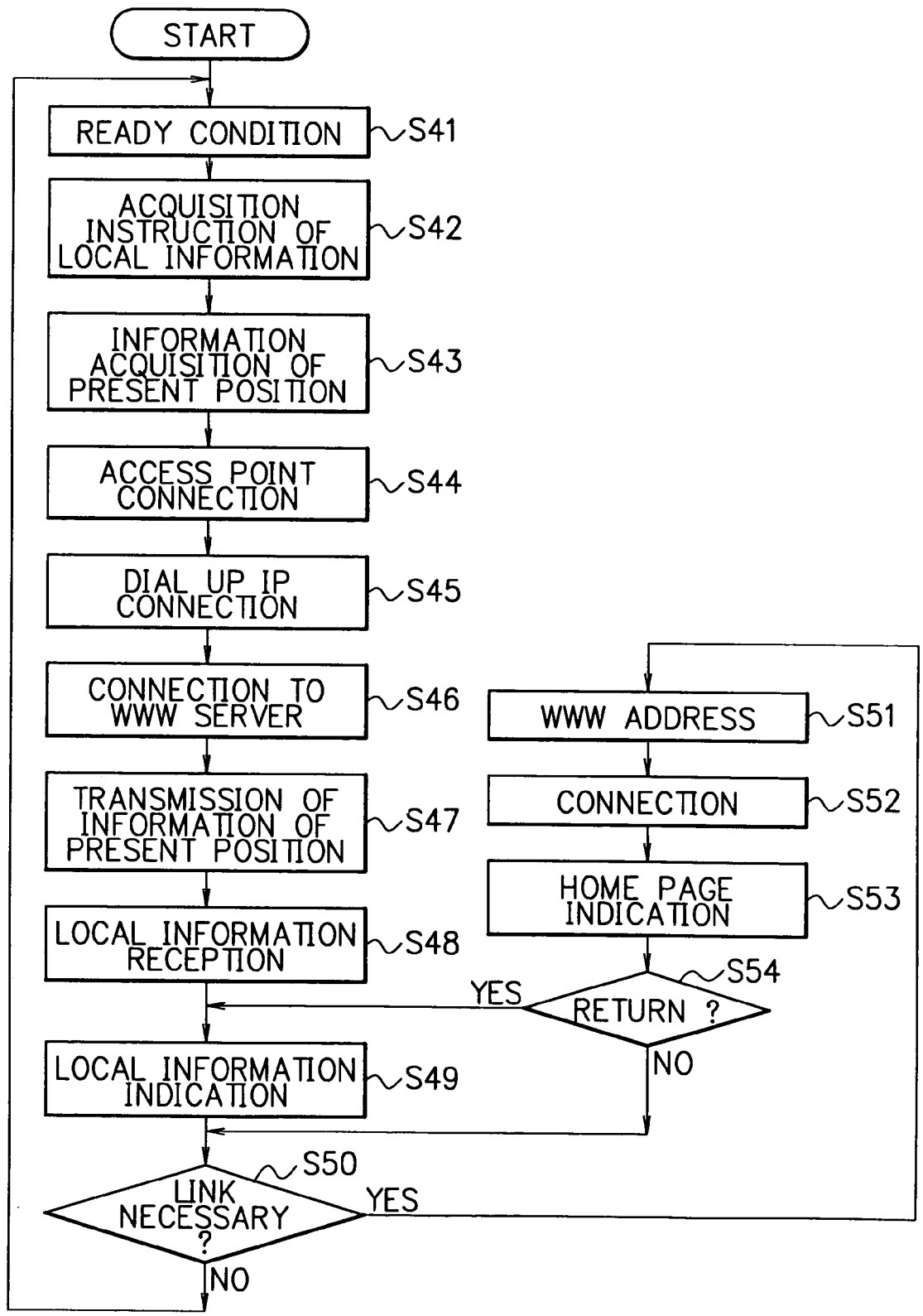
FIG. 2 is a flowchart explaining operation of the conventional technique shown in FIG. 11.
Figure 3:
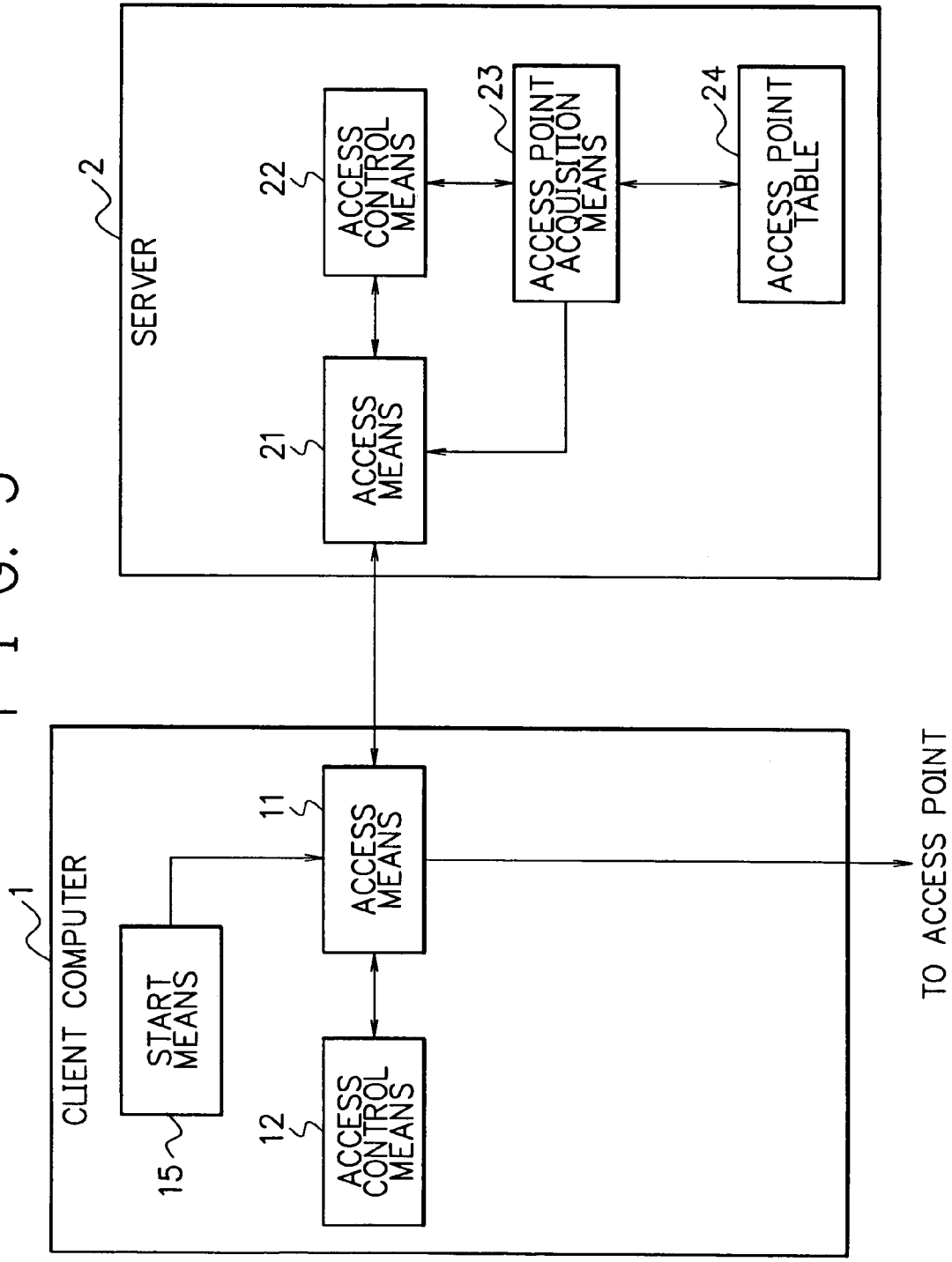
FIG. 3 is a block diagram showing a first embodiment of the present invention.

FIG. 3 is a block diagram of the first embodiment of a telephone circuit distribution system of the present invention. The client computer 1 consists of an access means 11, an access control means 12, and a start means 15. The server 2 connected to the client computer 1 consists of an access means 21, an access control means 22, an access point acquisition means 23, and an access point table 24. The client computer 1 is attempted to connect to the optimum access point under support of the server 2.

The start means 15 on the side of the client computer 1 stands by the present system while being manipulated by the user. The ready of the system can be realized in such a way that click of a mouse to an icon for the sake of start of the present system ready program is executed. Such start icon is indicated on a screen of a display unit of the client computer 1.

The access means 11 makes a telephone call to the server 2 or the access point according to instruction from the start means 15 or the access control means 12. Or, the access means 11 disconnects the telephone circuit.

The access control means 12 judges whether or not there exists information from the server 2. Further, when there exists the information, the access control means 12 judges whether or not such information is an access point information, thus giving necessary instruction to the access means 11.

On the other hand, the access means 21 on the side of the server 2 receives telephone call from the client computer 1. The access means 21 performs information that telephone number is non-informed according to instruction from the access control means 22 to the client computer 1. The access means 21 performs information of the nearest access point to the client computer 1 acquired from the access point acquisition means 23 to the client computer 1.

In the case where the access control means 22 can not acquire the telephone number of the client computer 1 when the access control means receives the telephone call of the client computer 1, the access control means 22 causes the access means 21 to notify to the client computer 1 that the telephone number is non-informed. While when the access control means 22 can acquire the telephone number of the client computer 1, the access control means 22 instructs the purport to the access point acquisition means 23.

Here, the telephone number information service is one of the services being provided by the telecommunication carriers as is generally known. When the user makes a contract with the telecommunication carriers undergoing the service, the telephone number of the caller is informed to the other party in the case of making a telephone calling. Some users do not like that the telephone number is known by the other party automatically. It is suitable that such the users make a contract with the telecommunication carriers of the telephone number non-informed. Consequently, the server 2 can acquire the telephone number of the client computer 1 automatically according to the contract content. Or, the server 2 can not acquire the telephone number of the client computer 1 according to the contract content.

When the access point acquisition means 23 judges that the access control means 22 can acquire the telephone number of the client computer 1. The access point acquisition means retrieves an access point table 24 using this telephone number, thus finding the most nearest access point to the area where the telephone number of the client computer 1 is allocated, before informing the access point to the access means 21, and also informing the effect to the access control means.

The access point table 24 is a table in which correspondence is registered between a plurality of prescribed telephone numbers and an access point of the nearest provider to the area to which access point such respective telephone numbers are allocated. FIG. 11 shows one example of such the access point table 24. Referring to FIG. 11, name of the access point, at least one telephone number of the access point and crowded condition are stored in the access point table 24 in every area code to which the telephone number of the user belongs. The telephone numbers of a plurality of the access points are allocated to the big urban complex called Tokyo or Osaka and its outskirts. Furthermore, the crowded condition means crowded condition of telephone circuit of the telephone number of the corresponding access point. The crowded condition is indicated with five stages. The smaller number of such stages shows the more crowded condition.

Next, there will be described operation of the present embodiment referring to flowchart of FIG. 4.

When the user attempts to connect the client computer 1 with the internet, the user stands by the client computer 1, before starting the present system by the start means 15. Subsequently, as described hereinafter, it is capable of connecting the client computer 1 to the internet although the user does not do anything.

Figure 4:
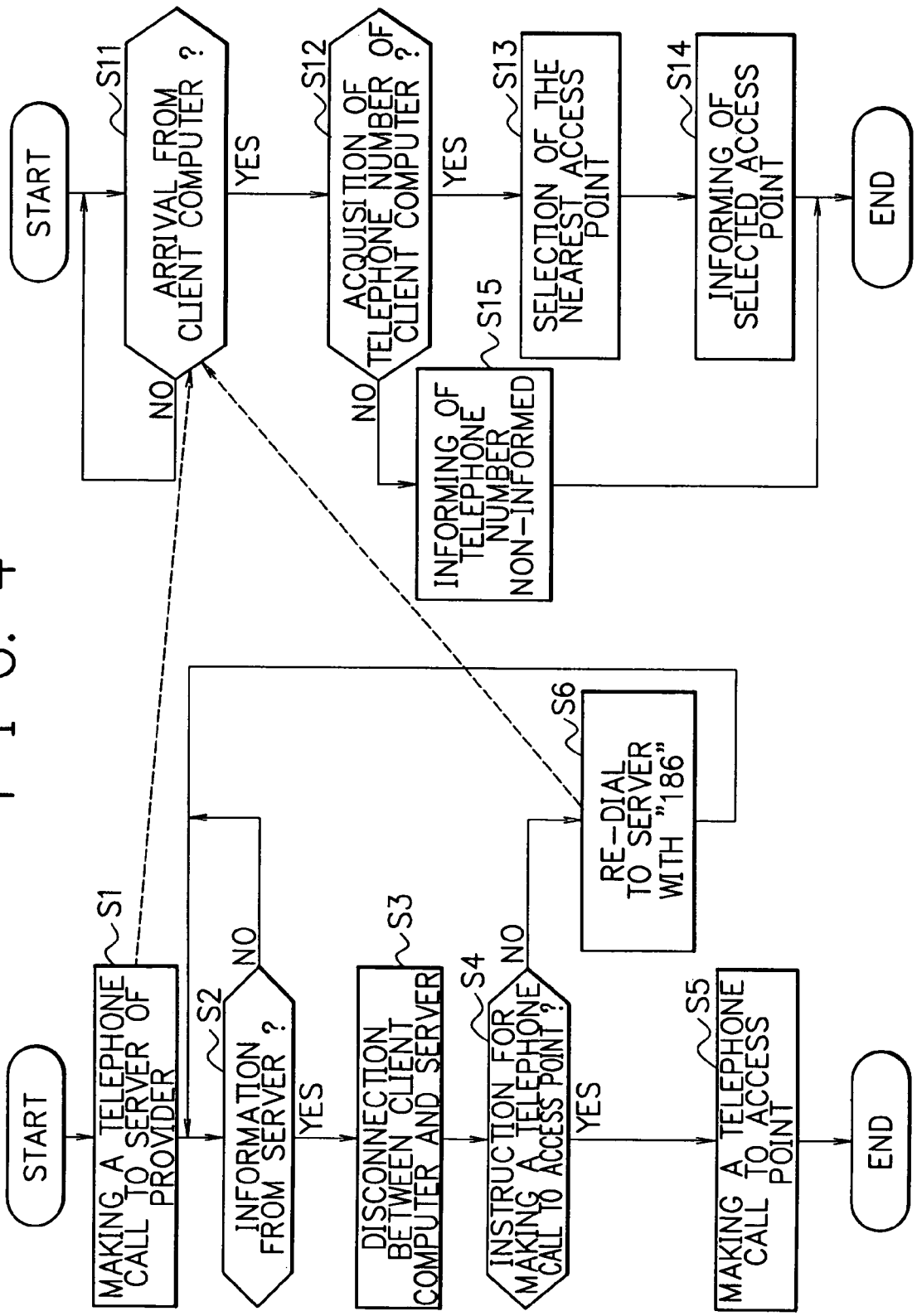
FIG. 4 is a flowchart showing operation of the first embodiment of the present invention.

The access means 12 makes a telephone call to the server 2 of the provider (STEP S1 of FIG. 4). In the side of the server 2, the access means 21 receives the telephone call of the access means 12 (STEP S11). The access control means 22 judges whether or not it is capable of being acquired the telephone number of the other party (STEP S12). When the telephone number of the other party is acquired, the access point acquisition means 23 selects the nearest access point from the access point table 24 (STEP S13). The access means 21 informs the access point to the client computer 1 (STEP S14). This case is a case where the user undergoes the telephone number information service.

In the side of the client computer 1, when the access means 11 receives information from the server 2 (STEP S2), once the access means 11 disconnects the telephone circuit (STEP S3). When the access control means 12 judges that the information from the server 2 is the information of the access point (STEP S4), the access control means 12 causes the access means 11 to make a telephone call to the access point (STEP S5). According to the operation, the user who manipulates the client computer 1 is capable of connecting the client computer 1 to the nearest access point to the position of the client computer 1 automatically.

On the other hand, when the client computer 1 whose contract content is of undergoing telephone number non-informed service, the access control means 22 can not acquire the telephone number of the other party (NO of STEP S12). The access control means 22 of the server 2 informs an effect of being the telephone number non-informed to the client computer 1 through the access means 21 (STEP S15).

The client computer 1 receives this information. The access control means 12 of the client computer 1 judges that the information received is not the information of the access point (STEP S4). The access means 11 performs redial for the server 2 with the number which is constituted in such a way that "186" is added to the head of the telephone number of the server 2 (STEP S6). When the user attempts undergoing telephone number non-informed service individually when the user undergoes the telephone number information service currently, "184" to be added to the head of the telephone number is given to the user. While when the user attempts undergoing the telephone number information service individually when the user undergoes the telephone number non-informed service currently, such "186" to be added to the head of the telephone number is given to the caller.

According to the operation, the server 2 can acquire surely the nearest access point to the client computer 1 this time. The client computer 1 is capable of being telephone-connected to the nearest access point according to the same procedure (STEPs S12, S13, S14, and S5) as the case where the user undergoes the above-described telephone number information service.

In the embodiment described above, the constitution thereof is a constitution in which the client computer makes a telephone call to the nearest connection destination of the client computer concerned automatically regardless of crowded condition of the telephone circuit. However, when there exists a plurality of connection destinations, it is capable of being thought constitution example that it causes the telephone call to be made preferentially and automatically to the connection destination which the crowded condition of the telephone circuit is the smallest.

Figure 9:
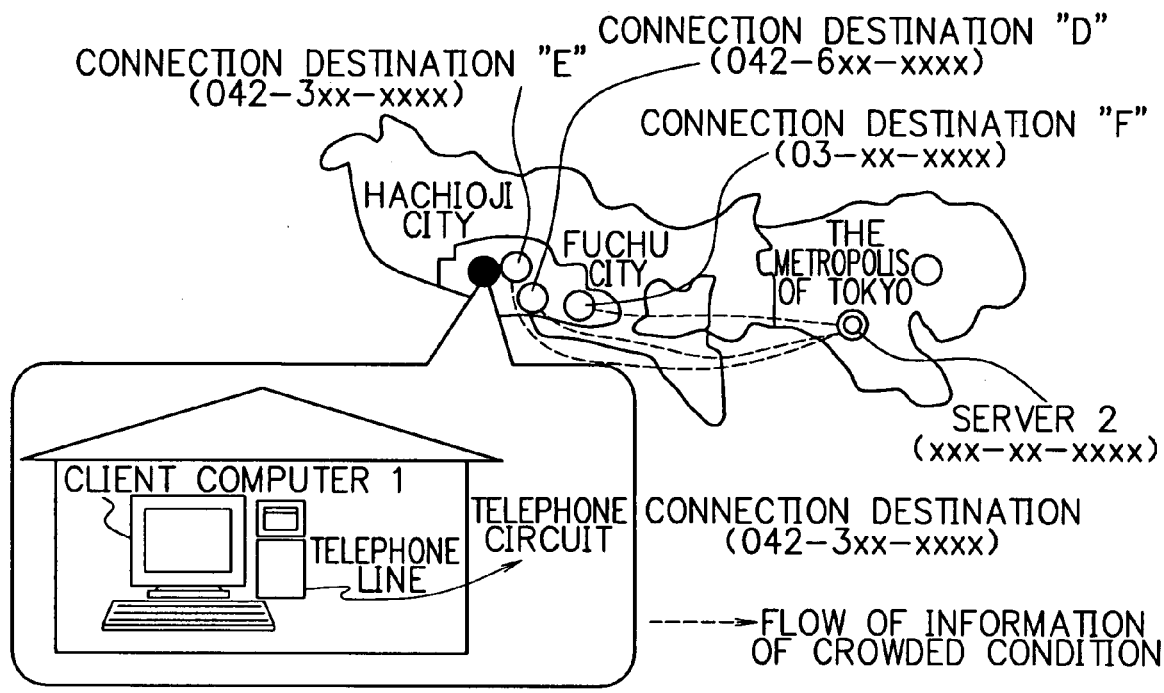
FIG. 9 is an another view explaining a conception of the present invention.

FIG. 9 is a schematic view showing directly such the embodiment. In FIG. 9, there exist the client computer 1 and three connection destinations D, E, and F in Hachioji City, and there exists the server 2 in the Ward of the Metropolis of Tokyo. The server 2 acquires information regarding crowded condition of the telephone circuit of the connection destinations D, E, and F beforehand. When the client computer 1 makes a telephone call to the server 2, the server 2 instructs the client computer 1 so as to make a telephone call to the connection destination whose telephone circuit is the most freest condition.

As a result thereof, with respect to the client computer 1, the probability that the telephone call can not be made caused by the fact that the connection destination is busy becomes small. Consequently, the user of the client computer 1 can save one trouble that the user should find another connection destination.

Furthermore, in FIG. 9, although it is shown that the whole connection destinations exist within the same City, it is suitable that the connection destination exist in different manicipalities. It is useful for the user who intends to connect speedy even though the telephone charge is somewhat high.

Moreover, as to a standard for selecting the connection destination, it is capable of being thought a combination example of a condition of nearness for the client computer and a condition of the crowded condition of the telephone circuit. Namely, it causes a plurality of connection destinations near by the client computer to be selected firstly. Next, it causes the connection destination whose crowded condition of the telephone circuit is the smallest to be selected from among the plurality of the connection destinations selected previously. As to this point, there will be described concretely referring to the access point table of FIG. 11. For instance, in area of Tokyo, there are provided a plurality of telephone number of the access points. The smallest crowded condition in the telephone number of the access point of Tokyo is "3". The telephone number of the smallest crowded condition is 03-3518-5100. Thus 03-3518-5100 to be the telephone number with the smallest crowded condition is selected.

Furthermore, inversely, it causes a plurality of connection destinations to be selected with the crowded condition of the telephone circuit as the standard. Next, it is suitable that it causes the nearest connection destination to the client computer to be selected from among the plurality of the connection destinations. For instance, the client computer in Tokyo, the smallest crowded condition is "3". As the access points whose crowded condition is lower, there are Aomori, Tama-Fuchu, Tokushima, and Miyazaki. The crowded condition of Miyazaki is "5", that is the lowest crowded condition. However, it is not realistic that the user of Tokyo utilizes access point of Miyazaki which is long distance from Tokyo. Consequently, Fuchu-Tama is selected, that is the nearest access point from among Aomori, Fuchu-Tama, and Tokushima with the crowded condition "4".

Figure 5:
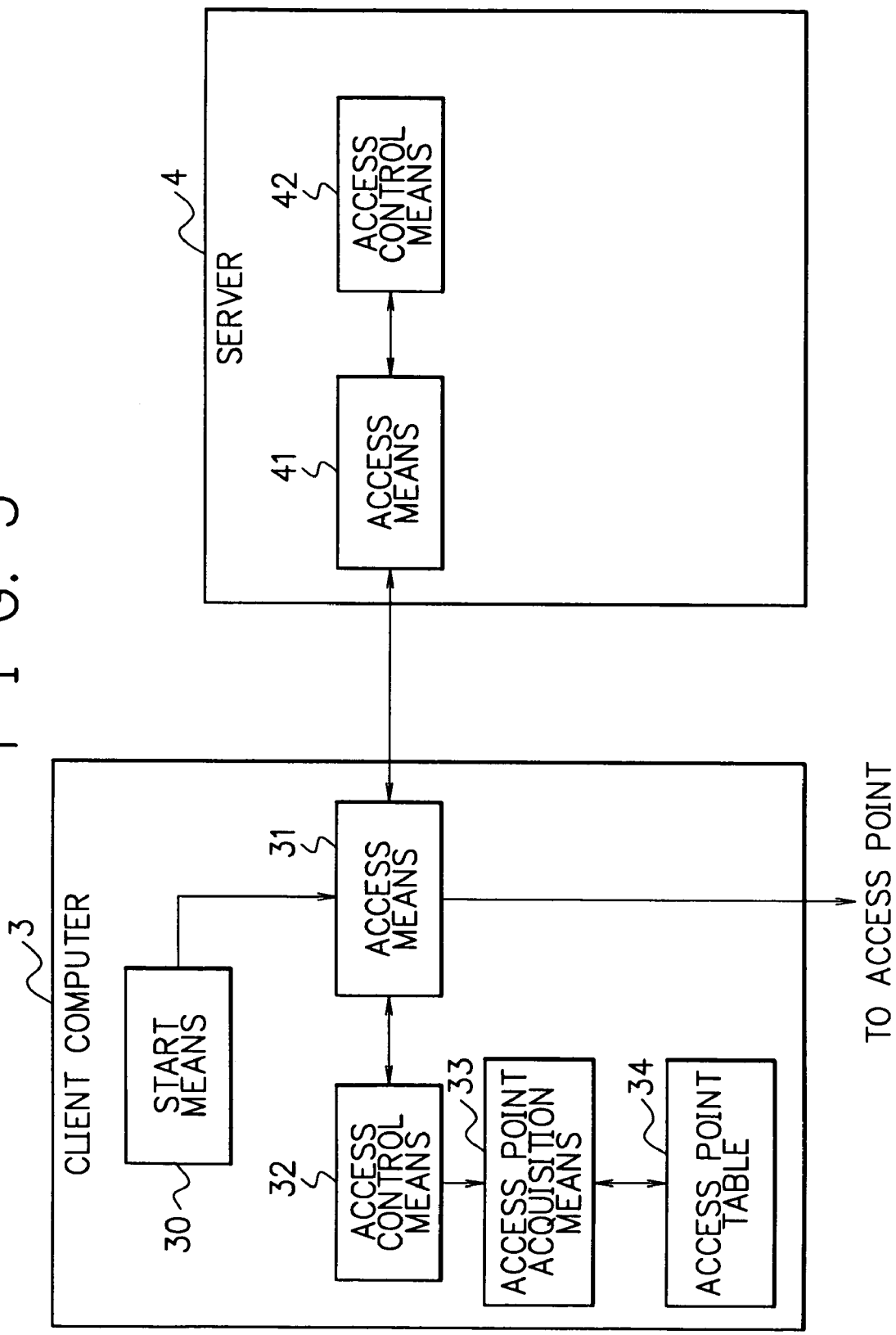
FIG. 5 is a block diagram showing a second embodiment of the present invention.

In the whole embodiments described above, the access point table is provided on the server. However, when distance between the connection destination and the client computer is used as the selection standard of the connection destination, it is capable of being thought that the access point table is provided on the client computer 3. FIG. 5 shows such a second embodiment of the present invention.

In FIG. 5, a client computer 3 is provided with an access means 31, an access control means 32, an access point acquisition means 33, an access point table 34, and start means 30. A server 4 that is connected to the client computer 3 is provided with an access means 41, and an access control means 42. The client computer 3 is attempted to connect the optimum access point under support of the server 4.

A start means 30 on the side of the client computer 3 which is manipulated by the user stands by the present system.

The access means 31 makes a telephone call to the server 4 or the access point according to instruction from the start means 30 or the access control means 32. Or, the access means 31 disconnects the telephone circuit.

The access control means 32 judges whether or not there exists information from the server 4 according to the information from the access means 31. Further, when there exists the information, the access control means 32 judges whether or not such information is information of a telephone number of the client computer 3, thus giving necessary instruction to the access means 31 or the access point acquisition means 33 according to the result thereof.

The access point acquisition means 33 judges that the access control means 32 can acquire the telephone number of the client computer 3. The access point acquisition means retrieves an access point table 34 using this telephone number, thus finding the most nearest access point to the area where the telephone number of the client computer 3 is allocated, before informing the access point to the access means 31, and also informing the effect to the access control means 32.

The access point table 34 is a table in which correspondence is registered between a plurality of prescribed telephone numbers and an access point of the nearest provider to the area to which access point such respective telephone numbers are allocated. The registration content is that the crowded condition is removed from indication content of FIG. 11. Because it is difficult to get hold of the crowded condition of the telephone circuit by the side of the client computer. Namely, names of the access points, at least one telephone number of the access point are stored in the access point table 34 in every area code to which the telephone number of the user belongs.

On the other hand, the access means 41 on the side of the server 4 receives telephone call from the client computer 3. The access means 41 performs information of the telephone number of the client computer 3, and informs that the client computer 3 undergoes telephone number non-informed service according to instruction from the access control means 42 to the client computer 3.

In the case where the access control means 32 can not acquire the telephone number of the client computer 3 when the access control means receives the telephone call of the client computer 3, the access control means 32 causes the access means 31 to inform to the client computer 3 that the telephone number is non-informed. While when the access control means 32 can acquire the telephone number of the client computer 3, the access control means 32 instructs the purport to the access means 41. This judgement is based on the fact whether or not the client computer 3 contracts to undergo the telephone number information service.

Next, there will be described operation of the present embodiment referring to flowchart of FIG. 6.

When the user attempts to connect the client computer 3 with the internet, the user stands by the client computer 3, before starting the present system by the start means 35. Subsequently, as described hereinafter, it is capable of connecting the client computer 3 to the internet although the user does not do anything.

Figure 6:
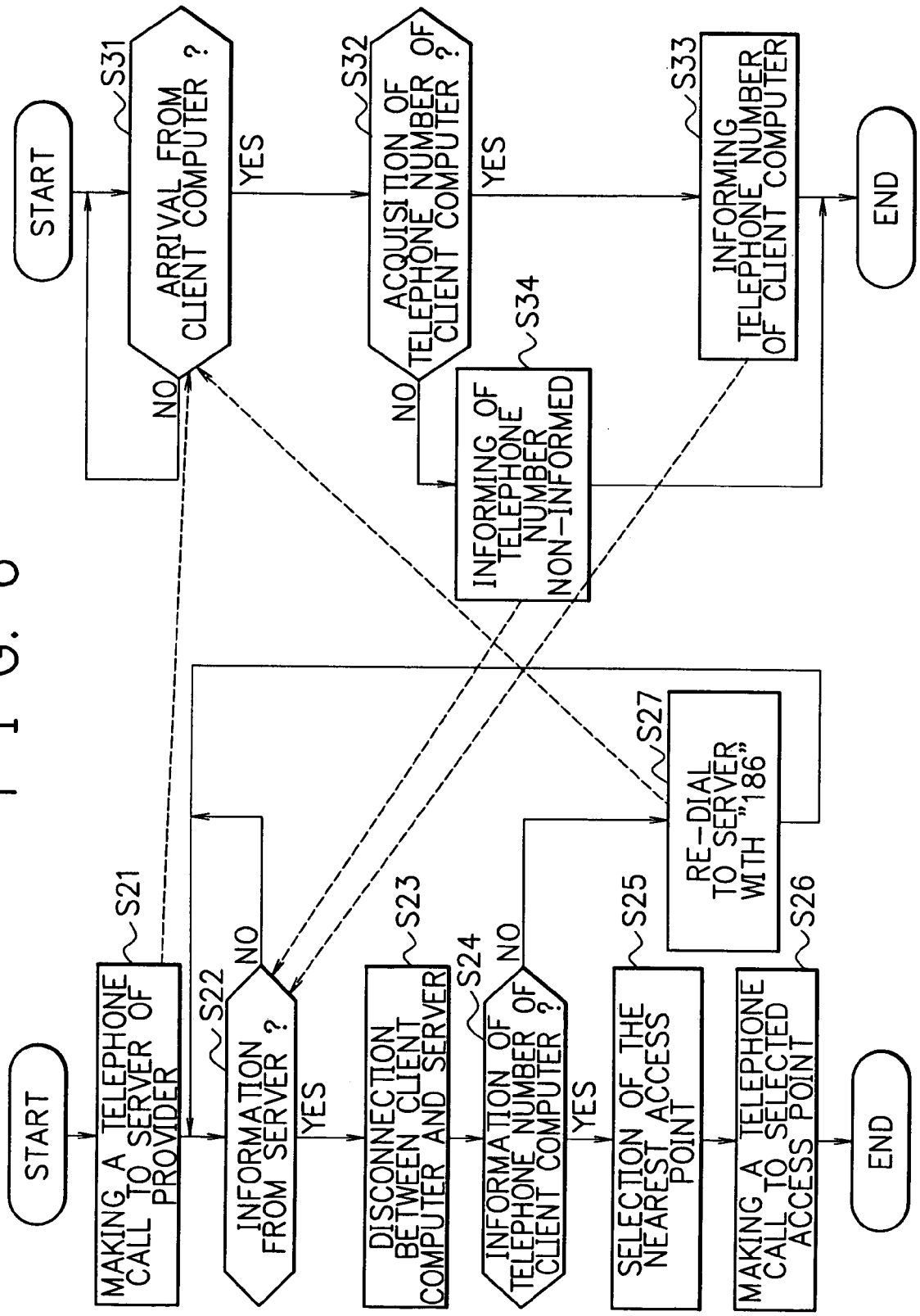
FIG. 6 is a flowchart showing operation of the second embodiment of the present invention.

The access means 32 makes a telephone call to the server 4 of the provider (STEP S21 of FIG. 6). In the side of the server 4, the access means 41 receives the telephone call of the access means 32 (STEP S31). The access control means 42 judges whether or not it is capable of acquiring the telephone number of the other party (STEP S32). When the telephone number of the other party is acquired, the access means 41 informs the telephone number (telephone number of the client computer 3) to the client computer 3 (STEP S33). While when the telephone number of the other party can not be acquired, the access means 41 informs the effect that the telephone number is of the telephone number non-informed service to the client computer 3 (STEP S34).

In the side of the client computer 3, when the access means 31 receives information from the server 4 (STEP S22), once the access means 31 disconnects the telephone circuit with the server 4 (STEP S23). When the access control means 32 judges that the information from the server 4 is the information of the telephone number of the client computer 3 (STEP S24), the access control means 32 causes the access point acquisition means 33 to retrieve the access point table 34 according to the telephone number thus causing the client computer 3 to select the nearest access point (STEP S25).

The access point acquisition means 33 informs the selected access point to the access means 31. The access point acquisition means 33 informs the effect thereof to the access point control means 32. The access means 31 who receives the information makes telephone call to the selected access point (STEP S26). According to the operation, the user who manipulates the client computer 3 is capable of connecting the client computer 3 to the nearest access point to the position of the client computer 3.

On the other hand, when the client computer 3 whose contract content is of undergoing telephone number non-informed service, the access control means 32 can not acquire the telephone number of the other party (NO of STEP S32). The access control means 42 of the server 4 informs an effect of being the telephone number non-informed to the client computer 3 through the access means 41 (STEP S34).

The client computer 3 receives this information. The access control means 32 of the client computer 3 judges that the information received is not the information of the telephone number of the client computer 3 (STEP S24). The access means 31 performs redial for the server 4 with the number which is constituted in such a way that "186" is added to the head of the telephone number of the server 4 according to the instruction of the access control means 32 (STEP S27).

According to the operation, the server 4 can acquire surely the telephone number of the client computer 3 this time. The client computer 3 is capable of being telephone-connected to the nearest access point according to the same procedure (STEPs S32, S33, S24, S25 and S26) as the case where the user undergoes the above-described telephone number information service.

As described above, according to the present embodiment, when the access point table is provided on the side of the client computer, the user and/or the client computer can connect to the nearest access point even though the user and/or the client computer does not know the own telephone number.

Next, there will be described a third embodiment of the present invention.

Figure 10:
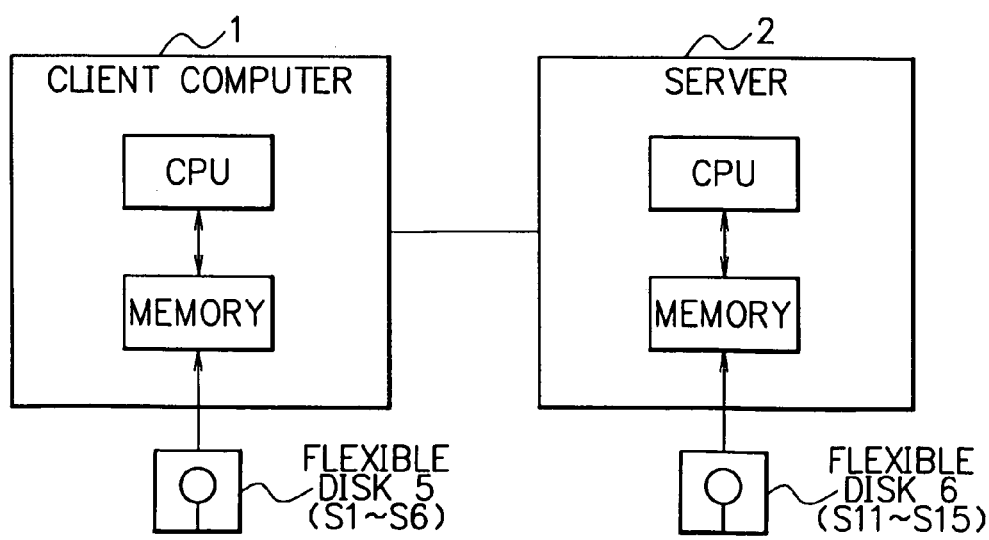
FIG. 10 is a block diagram showing a third embodiment of the present invention.

Referring to FIG. 10, the third embodiment of the present invention is provided with a semiconductor memory storing therein a program for telephone circuit distribution, and storage medium such as flexible disks 5 and 6 and so forth. The program stored in the flexible disks 5 and 6 are read by the client computer 7 and the server 8, thus controlling operation of the client computer 7 and server 8.

The client computer 7 and the server 8 executes the same processing as the client computer 1 and the server 2 in the first embodiment or the client computer 3 and the server 4 in the second embodiment according to these programs.

As described above, the present invention utilizes the telephone number accompanying with calling signal from the client computer for specifying the client computer. The present invention gives information related to the telephone number such as the telephone number or the access point.

According to the present invention, it causes the telephone number of the client computer to be acquired automatically while utilizing the telephone number information service. It is capable of connecting the client computer automatically to the nearest access point of the client computer or the smallest access point of the crowded condition of the telephone circuit according to the acquired telephone number. Accordingly, the user who manipulates the client computer enables internet connection to be achieved simply. On this occasion, the user is suitable that he may not even know the telephone number of own the client computer.

Furthermore, even though the telephone number of the access point of the provider is changed, it causes the access point table to be updated in accordance with the changed telephone number. There is the effect that the program of the client computer is capable of performing the internet connection without the exception of being conscious of the change of the telephone number.

While preferred embodiments of the invention have been described using specific terms, the description has been for illustrative purposes only, and it is to be understood that changes and variations may be made without departing from the spirit or scope of the following claims.

What is claimed is:

1. A position specifying system for specifying a position of a computer, comprising:
acquisition means for acquiring a telephone number of the computer comprising a function of deciding whether or not a telephone number of the computer can be obtained,
wherein the computer is a caller and the system specifies the position of the computer automatically based on the telephone number obtained from a telephone number information service,
wherein when the telephone number of the computer is identified, said telephone number information service automatically provides a number of the caller computer to another computer, and wherein when the telephone number of the computer is not identified, the computer is notified that the telephone number is not identified and a communication with the computer is disconnected, and the computer making a subsequent call to said another computer permitting said telephone number information service to identify the telephone number of the computer.

2. An internet connecting system comprising a first computer, and a second computer for connecting said first computer to the internet through an access point,
wherein said first computer comprises:
an access means which makes a telephone call to said second computer permitting a telephone number information service to automatically inform said second computer of a telephone number of said first computer, and which in order to connect to the internet, makes a telephone call to an access point, said access point is received from said second computer, and
wherein said second computer comprises:
a means for acquiring the telephone number of said first computer when said first computer makes a telephone call permitting said telephone number information service to inform the second computer of the telephone number of the first computer and when the acquiring means determines that the telephone number of the first computer cannot be identified, the first computer is notified that the telephone number is not identified and a communication with the first computer is disconnected;

a storage means storing a plurality of telephone numbers and information of a nearest access point of respective areas to which said plurality of telephone numbers are allocated; and an access point acquisition means for informing said first computer of a nearest access point associated with said telephone number selected from said stored information when the telephone number of the first computer is identified, selecting said access point with reference to said telephone number.

3. An internet connecting system as claimed in claim 2, wherein said storage means stores therein a plurality of telephone numbers and information of the nearest access point of each area to which said plurality of telephone numbers are allocated while associating said plurality of telephone numbers with the information of the nearest access points, and further stores therein a plurality of access points and information of crowded condition of telephone circuits directed to said respective plural access points while associating said plurality of access points with said information of the crowded condition, and wherein said access point acquisition means selects information of required access point in order to inform said first computer on the basis of the telephone number of said first computer acquired by said acquisition means, the information of the access means stored in said storage means, and information of the crowded condition of the telephone circuit.

4. An internet connecting system which comprises a first computer, and a second computer, for connecting said first computer to the internet through an access point, wherein said first computer comprises:

an access means which makes a telephone call to said second computer, and which in order to connect to the internet, makes a telephone call to an access point based on information about the access point received from said second computer, and wherein said second computer comprises:

a storage means for storing a plurality of access points and information concerning crowded condition of a telephone circuit for each of the plurality of access points;

an acquisition means for acquiring a telephone number of the first computer comprising a function of deciding whether a telephone number can be obtained or not, and when the telephone number of the first computer is not identified, the first computer is notified that the telephone number is not identified and a communication with the first computer is disconnected, and when the telephone number of the first computer is identified, selecting the access point with reference to the telephone number; and an access point acquisition means selecting information about an access point to inform said first computer of a crowded condition of a telephone circuit for the selected access point.

5. An internet connecting system which includes a first computer, and a second computer, for connecting said first computer to the internet through an access point, wherein said first computer comprises:

an access means making a telephone call to the second computer to acquire information about an access point in order to connect to the internet, said access means makes the call permitting a telephone number information service to automatically inform said second computer of a telephone number of said first computer, making a subsequent call to said second computer, when said second computer notifies said first computer that the telephone number of the first computer is not received, and making a telephone call to an access point, wherein said access point is designated by said second computer, and wherein said second computer comprises:

an access means informing said first computer to make a telephone call again and to permit said telephone number information service to provide the telephone number of the first computer to the second computer when said first computer makes a telephone call without permitting said telephone number information service to provide the telephone number of the first computer to the second computer;

an acquisition means acquiring the telephone number of said first computer that is informed when said first computer makes a telephone call in which said telephone number information service is permitted to inform the second computer of the telephone number of the first computer;

a storage means storing a plurality of telephone numbers, and information of nearest access points of each area to which said plurality of telephone numbers are allocated each of said plurality of the telephone numbers is associated with at least one nearest access point; and an access point acquisition means retrieving nearest access point from said storage means using the telephone number of said first computer.

6. An internet connecting system as claimed in claim 5, wherein said storage means stores therein a plurality of telephone numbers and information of the nearest access point of each area to which said plurality of telephone numbers are allocated while associating said plurality of telephone numbers with the information of the nearest access points, and further stores therein a plurality of access points and information of crowded condition of telephone circuits directed to said respective plural access points while associating said plurality of access points with said information of the crowded condition, and wherein said access point acquisition means selects information of required access point in order to inform said first computer on the basis of the telephone number of said first computer acquired by said acquisition means, the information of the access means stored in said storage means, and information of the crowded condition of the telephone circuit.

7. The information collecting system as claimed in claim 5, wherein:

said acquisition means for acquiring a telephone number comprises a function of deciding whether a telephone number can be obtained or not, when the telephone number of a client computer is not identified, notifying said computer that a telephone number is not identified and disconnecting a communication with said client computer, when the telephone number of a client computer is identified, selecting said access point with reference to said telephone number.

8. An internet connecting system which includes a first and a second computer, for connecting said first computer to an internet through an access point, wherein said first computer comprises:

a storage means storing a plurality of telephone numbers and at least one nearest access point of each area to which some of said plurality of telephone numbers are allocated, and wherein each telephone number of said plurality of telephone numbers is associated with at least one nearest access point;

an access means making a telephone call to said second computer by utilizing telephone number information service, which automatically informs said second computer of a telephone number of said first computer, and retrieving from said storage means using the telephone number of the first computer received from said second computer, the nearest access point associated with the received telephone number, thereby connecting to the internet via said retrieved access point; and a telephone number information means of the second computer for informing said first computer of the telephone number of the first computer when said first computer makes a telephone call while utilizing said telephone number information service and when the telephone number of the first computer is not identified, the first computer is notified that the telephone number is not identified and a communication with the first computer is disconnected.

9. An internet connecting system comprising a first and a second computer, for connecting said first computer to an internet through an access point, wherein said first computer comprises:

a storage means storing a plurality of telephone numbers and a nearest access point of each area to which at least some of said plurality of telephone numbers are allocated, wherein each telephone number of said plurality of telephone numbers is associated with at least one nearest access point; and an access means, for making a telephone call to said second computer and for making a subsequent call to said second computer when said second computer notifies said first computer that the telephone number of the first computer was not retrieved by a telephone number information service, and for retrieving from said storage means using said telephone number received from said second computer, a nearest access point associated with said telephone number and making a telephone call to the nearest access point thereby connecting to the internet, and wherein said second computer comprises:

an access means for informing said first computer to make a telephone call again while permitting said telephone number information service to identify the telephone number of the first computer when said first computer makes a telephone call in which said telephone number information service does not inform the second computer of the telephone number of the first computer; and a telephone number informing means acquiring the telephone number of said first computer when said first computer makes a telephone call while permitting said telephone number information service to identify the telephone number of the first computer and when the telephone number of the first computer is not identified, the first computer is notified that the telephone number is not identified and a communication with the first computer is disconnected.

10. A position specifying method comprising:

determining a telephone number of a calling computer using a telephone number information service;

when the telephone number of the calling computer is not identified, the calling computer is notified that the telephone number is not identified and a communication with the calling computer is disconnected and the calling computer makes a subsequent call to an another computer;

when the telephone number of the calling computer is identified, the telephone number of the calling computer is automatically communicated to said another computer, and said another computer specifies a position of the calling computer on the basis of a telephone number.

11. An information collecting method comprising the processes of:

storing a plurality of telephone numbers and information related to said plurality of telephone numbers wherein each telephone number of said plurality of telephone numbers is associated with the respective information;

acquiring a telephone number of a calling computer when a telephone number information service is permitted to automatically communicate the telephone number of the calling computer to a server and when the telephone number of the calling computer is not identified, notifying the calling computer that the telephone number is not identified and disconnecting a communication with the computer and the calling computer making a subsequent call to said server permitting the telephone information service to identify the telephone number of the computer; and collecting from said storage means information related to said telephone number.

12. An internet connecting method for connecting a first computer to an internet through an access point under support of a second computer comprising the processes of:

storing a plurality of telephone numbers and information of a nearest access point of respective areas to which said plurality of telephone numbers are allocated while associating said plurality of telephone numbers with the information of the access point according to said second computer;

making a telephone call by the first computer to said second computer while utilizing a telephone number information service for automatically informing said second computer of a telephone number of the first computer and when the telephone number of the first computer is not identified, notifying the first computer that the telephone number is not identified and disconnecting a communication with the first computer and the first computer making a subsequent call to the second computer by permitting said telephone number information service to identify the telephone number of the first computer;

acquiring the telephone number of said first computer said telephone number information service identifies the telephone number of said first computer;

retrieving a nearest access point from said storage means by using said acquired telephone number;

informing said first computer of the nearest access point associated with said telephone number; and making a telephone call to the nearest access point received from said second computer to connect the first computer to the internet.

13. An internet connecting method as claimed in claim 12, wherein said storage means stores a plurality of telephone numbers and information of a nearest access point of each area to which at least some telephones from said plurality of telephone numbers are allocated while associating each of said plurality of telephone numbers with an information of at least one nearest access point, and stores a plurality of access points and information of crowded condition of telephone circuits directed to each of said plural access points by associating each of said plurality of access points with said information of the crowded condition, and wherein said second computer selects information of required access point in order to inform said first computer on the basis of the telephone number of said first computer acquired by said acquisition means, the information of the access means stored in said storage means, and information of the crowded condition of the telephone circuit.

14. A storage medium storing therein a program for executing the internet connecting method as claimed in claim 12, wherein said storage means stores therein a plurality of telephone numbers and information of the nearest access point of each area to which said plurality of telephone numbers are allocated while associating said plurality of telephone numbers with the information of the nearest access points, and stores therein a plurality of access points and information of crowded condition of telephone circuits directed to said respective plural access points while associating said plurality of access points with said information of the crowded condition, and wherein said second computer selects information of required access point in order to inform said first computer on the basis of the telephone number of said first computer acquired by said acquisition means, the information of the access means stored in said storage means, and information of the crowded condition of the telephone circuit.

15. An internet connecting method for connecting a first computer to an internet through an access point under support of a second computer comprising:

storing in a storage means of said second computer, a plurality of access points and information concerning crowded condition of a telephone circuit for each access point in said plurality of access points;

making a telephone call by said first computer to said second computer;

determining whether a telephone number of said first computer can be obtained or not;

when the telephone number of the first computer is not identified, notifying said first computer that the telephone number is not identified and disconnecting a communication with said first computer, and the first computer making a subsequent call to said second computer;

when the telephone number is identified, selecting required information of an access point to inform said first computer of the crowded condition of a telephone circuit; and making by said first computer a telephone call to an access point based on the information on the access point received from said second computer, to connect said first computer to the internet.

16. An internet connecting method for connecting a first computer to an internet through an access point under support of a second computer comprising:

storing in a storage means of the second computer, a plurality of telephone numbers, and information of a nearest access point of each area to which at least some telephone numbers of said plurality of telephone numbers are allocated and associating each of said plurality of the telephone numbers with said information of at least one said nearest access point;

making a telephone call by said first computer to said second computer;

determining whether or not a telephone number of the first computer can be obtained;

informing said first computer to make a telephone call again and to permit said telephone number information service to inform the second computer of the telephone number of the first computer when said first computer makes a telephone call without permitting said telephone number information service to inform the second computer of the telephone number of the first computer, said telephone number information service automatically informs said second computer of the telephone number of the calling first computer;

making the telephone call by said first computer to said second computer while permitting said telephone number information service to inform the second computer of the telephone number of the first computer;

acquiring by the second computer the telephone number of said first computer;

retrieving by said second computer from said storage means using the telephone number of said first computer information of a nearest access point associated with the telephone number; and making a telephone call to the access point based on information of the access point received from said second computer by the first computer to connect to the internet.

17. An internet connecting method, as claimed in claim 16, wherein said storage means stores therein a plurality of telephone numbers and information of the nearest access point of each area to which said plurality of telephone numbers are allocated while associating said plurality of telephone numbers with the information of the nearest access points, and stores therein a plurality of access points and information of crowded condition of telephone circuits directed to said respective plural access points while associating said plurality of access points with said information of the crowded condition, and wherein said second computer selects information of required access point in order to inform said first computer on the basis of the telephone number of said first computer acquired by said acquisition means, the information of the access means stored in said storage means, and information of the crowded condition of the telephone circuit.

18. A storage medium storing therein a program for executing said internet connecting method described in claim 17, wherein said storage means stores therein a plurality of telephone numbers and information of the nearest access point of each area to which said plurality of telephone numbers are allocated while associating said plurality of telephone numbers with the information of the nearest access points, and stores therein a plurality of access points and information of crowded condition of telephone circuits directed to said respective plural access points while associating said plurality of access points with said information of the crowded condition, and wherein said second computer selects information of required access point in order to inform said first computer on the basis of the telephone number of said first computer acquired by said acquisition means, the information of the access means stored in said storage means, and information of the crowded condition of the telephone circuit.

19. An internet connecting method for connecting a first computer to an internet through an access point under support of a second computer comprising:

storing in a storage means of said first computer a plurality of telephone numbers and a nearest access point of each area to which said respective plurality of telephone numbers are allocated and while associating said plurality of telephone numbers with said information of the nearest access point;

making a telephone call by said first computer to said second computer while utilizing telephone number information service, when the telephone number of the first computer is not identified, notifying said first computer that the telephone number is not identified and disconnecting a communication with said first computer, and the first computer making a subsequent call to said second computer permitting the telephone number information service to inform the second computer of the telephone number of the first computer; and when the telephone number is identified, informing the second computer about the telephone number of the first computer automatically and retrieving from said storage means of the second computer nearest access point information for connecting to the internet using the telephone number of the first computer.

20. An internet connecting method for connecting a first computer to an internet through an access point under support of a second computer comprising:

storing in a storage means of said first computer, a plurality of telephone numbers, and information of a nearest access point of each area, each of said plurality of telephone numbers are allocated to at least one said area;

said first computer making a telephone call to said second computer;

the second computer determining whether or not a telephone number of the first computer can be obtained;

the second computer informing said first computer to make a telephone call again and to permit a telephone number information service to determine the telephone number of the first computer when said first computer makes a telephone call in which said telephone number information service cannot inform the second computer of the telephone number of the first computer, when said telephone number information is permitted to inform of the telephone number of the first computer, the telephone number information service automatically informs the second computer of a telephone number of a caller;

said first computer making a telephone call to said second computer again while permitting said telephone number information service to inform the telephone number of the first computer, when said second computer notified said first computer to call again; and retrieving from said storage means of the first computer by using the telephone number received from said second computer, a nearest access point for the telephone number, making by the first computer a telephone call to the nearest access point, thus connecting to the internet.

21. A storage medium storing therein a program for executing an internet connecting method for connecting a first computer to an internet through an access point under support of a second computer comprising:

storing in said second computer a plurality of telephone numbers and information of the nearest access point for respective areas, each of said plurality of telephone numbers is allocated to at least one said respective area;

making a telephone call by said first computer to said second computer while utilizing a telephone number information service, which automatically provides a telephone number of a caller to a party being called, wherein when the telephone number of the first computer is not identified by the telephone number information service, notifying said first computer that the telephone number is not identified and disconnecting a communication with said first computer, and the first computer making a subsequent call to said second computer;

and when the telephone number is identified, acquiring by said second computer the telephone number of said first computer;

informing said first computer about nearest access point associated with said telephone number, after retrieving the nearest access point from said storage means of said second computer; and making a telephone call by first computer to the nearest access point received from said second computer to connect to the internet.

22. A storage medium storing therein a program for executing an internet connecting method for connecting a first computer to an internet through an access point under support of a second computer, comprising:

storing in a storage means of said second computer a plurality of access points and information concerning crowded condition of a telephone circuit for each of said plurality of access points, making a telephone call by said first computer to said second computer;

when a telephone number of the first computer is not identified, notifying said first computer that the telephone number is not identified and disconnecting a communication with said first computer, and the first computer making a subsequent call to said second computer permitting said telephone number information service to identify the telephone number of the first computer and to inform the identified telephone number to the second computer;

when the telephone number is identified, selecting by said second computer required information of an access point to inform said first computer on the basis of information of a crowded condition of the telephone circuit for said access point stored in said storage means; and making a telephone call by said first computer to an access point based on information received from said second computer to connect to the internet.

23. A storage medium storing therein a program for a process for storing in a storage means a plurality of telephone numbers, and information of a nearest access point of each area, said plurality of telephone numbers are allocated to at least one area according to a second computer;

a process for making a telephone call to said second computer according to said first computer;

a process for acquiring a telephone number of the computer comprising a function of deciding whether or not the telephone number of the first computer can be obtained;

a process for informing said first computer to make a telephone call again while permitting said telephone number information service to inform of the telephone number of the first computer when said first computer makes a telephone call in which the telephone number of said first computer is not obtained, wherein said telephone number information service automatically informs said second computer of the telephone number of the calling computer when the informing is permitted;

a process for acquiring the telephone number of said first computer when said first computer makes a telephone call in which said telephone number information service is permitted to inform the telephone number of the first computer;

a process for retrieving said storage means using the telephone number of said first computer acquired by said acquisition means before informing said first computer about information of the nearest access point that is stored while being associated with the telephone number concerned according to said second computer; and a process for making a telephone call to the nearest access point on the basis of information of the access point from said second computer, to connect the first computer to the internet according to the first computer.

24. A storage medium storing therein a program for executing an internet connecting method for connecting a first computer to an internet through an access point under support of a second computer, comprising the processes of:

a process for storing in a storage means a plurality of telephone numbers and nearest access point of each area to which at least some of said plurality of telephone numbers are allocated, each of said plurality of telephone numbers is associated with the nearest access point according to said first computer;

a process for making a telephone call from said first computer to said second computer while utilizing telephone number information service, when the telephone number of said first computer is identified, notifying said first computer that the telephone number is not identified and disconnecting a communication with said first computer, and the first computer making a subsequent call to said second computer permitting the telephone number information service to report the telephone number of the first computer;

when the telephone number is identified and the reporting is permitted, said telephone number information service automatically informs said second computer of the telephone number of said first computer; and a process for retrieving from said storage means with said telephone number of the first computer received from said second computer, a nearest access point for said telephone number, and subsequently, making a telephone call to the nearest access point thus connecting to the internet according to said first computer.

25. A storage medium storing therein a program for executing an internet connecting method for connecting a first computer to an internet through an access point under support of a second computer comprising the processes of:

a process for storing in a storage means a plurality of telephone numbers and information of a nearest access point of each area to which at least some of said plurality of telephone numbers are allocated, each of said plurality of telephone numbers is associated with information of at least one nearest access point according to said first computer;

a process for making a telephone call to said second computer according to said first computer;

a process for determining whether or not a telephone number of the first computer can be obtained;

a process for informing said first computer to make a telephone call again while permitting said telephone number information service to report the telephone number of the first computer when the telephone number of the first computer is not obtained, wherein, when said telephone number information service is permitted to report the telephone number of the first computer, the telephone number information service automatically informs said second computer of a telephone number of the first computer; and a process for retrieving from said storage means using the telephone number of the first computer received from said second computer, the nearest access point associated with said telephone number, and subsequently, making a telephone call to the nearest access point thereby connecting said first computer to the internet.

26. An information collecting system comprising:

an acquisition means for acquiring a telephone number of a caller computer by utilizing a telephone number information service, which automatically communicates the telephone number of the caller to another party;

a storage means for storing a plurality of telephone numbers and information related to said plurality of telephone numbers, said plurality of telephone numbers are associated with the information; and a collecting means for collecting information from said storage means related to said acquired telephone number;

said acquisition means for acquiring a telephone number comprises a function of deciding whether a telephone number can be obtained or not, when the telephone number of a client computer is not identified, notifying said computer that a telephone number is not identified and disconnecting a communication with said client computer, when the telephone number of a client computer is identified, selecting said access point with reference to said telephone number.

27. An internet connecting method for connecting a first computer to an internet through an access point under support of a second computer comprising:

said first computer calls said second computer;

a telephone number information service determining whether or not the telephone number of the first computer can be identified, and if the telephone number of the first computer can be identified, identifying the telephone number of the first computer;

the second computer determining whether or not the telephone number information services identified the telephone number of the first computer;

when the second computer determines that the telephone number of the first computer was identified, the second computer executes the following operations:

determines at least one access point number based on the identified telephone number of the first computer and additional conditions related to status of access points;

provides the first computer with the at least one determined access point number;

when the second computer determines that the telephone number of the first computer was not identified, the second computer executes the following operations:

informs said first computer that the telephone number of the first computer cannot be identified; and ends the communication with the first computer, wherein the first computer uses the at least one determined access point number to connect to an Internet.

28. The internet connecting method according to claim 27, wherein when the second computer informs the first computer that the telephone number of the first computer is not identified, the first computer calls the second computer again permitting the telephone number information service to identify the telephone number of the first computer.

29. The internet connecting method according to claim 28, wherein the first computer permits the telephone number information service to identify the telephone number of the first computer by adding a prefix to the number being dialed when connecting with the second computer.

30. The internet connecting method according to claim 27, wherein the telephone number information service is a service identifying a telephone number of a caller.

31. The internet connecting method according to claim 27, wherein the additional conditions related to status of access points comprises at least one of number of users currently using each of the access points and location of each of the access points.

* * * * *